(12) United States Patent
Goodenough et al.

(10) Patent No.: US 10,333,138 B2
(45) Date of Patent: Jun. 25, 2019

(54) CATHODE ADDITIVE FOR RECHARGEABLE SODIUM BATTERIES

(71) Applicant: Board of Regents, The University of Texas System, Austin, TX (US)

(72) Inventors: John B. Goodenough, Austin, TX (US); Kyusung Park, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 156 days.

(21) Appl. No.: 15/196,670

(22) Filed: Jun. 29, 2016

(65) Prior Publication Data

US 2017/0005327 A1     Jan. 5, 2017

Related U.S. Application Data

(60) Provisional application No. 62/187,658, filed on Jul. 1, 2015.

(51) Int. Cl.
| | |
|---|---|
| *H01M 4/02* | (2006.01) |
| *H01M 4/36* | (2006.01) |
| *H01M 4/58* | (2010.01) |
| *H01M 4/525* | (2010.01) |
| *H01M 10/054* | (2010.01) |

(52) U.S. Cl.
CPC ........... *H01M 4/364* (2013.01); *H01M 4/525* (2013.01); *H01M 10/054* (2013.01); *H01M 4/582* (2013.01); *H01M 4/5815* (2013.01); *H01M 4/5825* (2013.01); *H01M 2004/028* (2013.01)

(58) Field of Classification Search
CPC .... H01M 4/364; H01M 4/525; H01M 4/5815; H01M 4/582; H01M 4/5825; H01M 10/054; H01M 2004/028
See application file for complete search history.

(56) References Cited

U.S. PATENT DOCUMENTS

| | | | | |
|---|---|---|---|---|
| 2002/0012843 | A1* | 1/2002 | Munakata | H01M 4/485 429/231.1 |
| 2010/0129715 | A1* | 5/2010 | Saito | H01M 4/505 429/224 |
| 2013/0252106 | A1 | 9/2013 | Numata et al. | |

(Continued)

FOREIGN PATENT DOCUMENTS

| | | |
|---|---|---|
| JP | 2010-040311 | 2/2010 |
| JP | 2013-089506 | 5/2013 |

(Continued)

OTHER PUBLICATIONS

Han et al.; "Structural evolution and electrochemistry of monoclinic NaNiO2 upon first cycling process"; Journal of Power Sources 258; available online Feb. 21, 2014; pp. 266-271. (Year: 2014).*

(Continued)

*Primary Examiner* — Gregg Cantelmo
(74) *Attorney, Agent, or Firm* — Baker Botts L.L.P.

(57) ABSTRACT

The present disclosure relates to a cathode additive for a rechargeable sodium battery, to mixtures of the additive and a cathode active material, to cathodes containing the additive, to electrochemical cells with cathodes containing the additive, and to rechargeable batteries with cathodes containing the additive.

11 Claims, 6 Drawing Sheets

(56) References Cited

U.S. PATENT DOCUMENTS

2015/0194672 A1* 7/2015 Barker .................. C01G 53/42
429/221
2015/0303470 A1 10/2015 Honma et al.

FOREIGN PATENT DOCUMENTS

KR 10-2014-0142703 12/2014
WO 2014-132174 9/2014

OTHER PUBLICATIONS

Park et al.; "Electrochemical and Chemical Properties of Na2NiO2 as a Cathode Additive for a Rechargeable Sodium Battery"; Chemistry of Materials 27, available online Sep. 1, 2015; pp. 6682-6688. (Year: 2015).*

Chang Keun Back et al., "Electrochemical Properties and Gas Evolution Behavior of Overlithiated Li2NiO2 as Cathode Active Mass for Rechargeable Li Ion Batteries", Journal of the Electrochemical Society, 159 (6) A887-A893 (2012).

Hochun Lee et al., "Li2NiO2 as a Novel Cathode Additive for Overdischarge Protection of Li-Ion Batteries", Chem. Mater. 2008, 20, 5-7.

Hosang Park et al., "Li2NiO2as a sacrificing positive additive for lithium-ion batteries", Electrochimica Acta 108 (2013) 591-595.

International Search Report and Written Opinion for PCT Patent Application No. PCT/US2016/039959, dated Oct. 12, 2016; 11 pages.

International Preliminary Report on Patentability for PCT Patent Application No. PCT/US2016/039959, dated Jan. 11, 2018; 7 pages.

* cited by examiner

CATHODE ADDITIVE FOR RECHARGEABLE SODIUM BATTERIES

PRIORITY CLAIM

The present invention claims priority to U.S. Provisional Patent Application Ser. No. 62/187,658 filed Jul. 1, 2015, titled "Cathode Additive Rechargeable Sodium Batteries" and incorporated by reference herein.

TECHNICAL FIELD

The disclosure relates to a cathode additive for rechargeable sodium batteries.

BACKGROUND

Basic Principles of Batteries and Electrochemical Cells

Batteries are divided into two principal types, primary batteries and secondary batteries. Primary batteries are used once and are then exhausted. Secondary batteries are also often called rechargeable batteries because, after use, they may be recharged, then used again. In rechargeable batteries, each charge/discharge process is called a cycle. Rechargeable batteries eventually reach an end of their usable life, but typically only after many charge/discharge cycles.

A rechargeable battery includes an electrochemical cell and optionally other materials, such as a casing to protect the cell and wires or other connectors to allow the battery to interface with the outside world. An electrochemical cell includes two electrodes, a positive electrode, called the cathode and, a negative electrode, called the anode, an insulator separating the electrodes so the battery does not short out, and an electrolyte that transports the ionic component of the chemical reaction between the two electrodes and forces the electronic component to be transported outside the cell. The anode is the reductant of the chemical reaction, the cathode the oxidant, so on discharge electrons flow from the anode to the cathode and are charge-compensated by cations flowing inside the cell from the anode to the cathode. This process transforms the chemical energy of the reaction into electric power in the external circuit by delivering a current at a voltage for a time $\Delta t$ until the chemical reaction is completed. If the charged cell has the electric current cut off, which is called open-circuit, electrons cannot flow, but the ions inside the cell can flow without being charge-compensated. As a result, the cathode becomes positively charged on open-circuit, which is why the cathode is called the positive electrode.

The cation that is transported between the electrodes by the electrolyte is called the "working ion." A rechargeable battery is named after the working cation. For example, the positive ion in a lithium secondary battery is the lithium ion ($Li^+$). In a sodium secondary battery it is the sodium ion ($Na^+$).

To recharge the battery, the same process happens in reverse by the application of electric power. By supplying electric energy to the battery, electrons are induced to leave the cathode and enter the anode. To keep the overall charge neutral in the cathode and anode, a positive ion leaves the cathode and enters the electrolyte, and a positive ion also leaves the electrolyte and enters the anode. The efficiency of electrical-energy storage in a rechargeable battery depends on the reversibility of the chemical reaction between the two electrodes.

Because the ionic conductivity in the electrolyte is many times smaller than the electronic conductivity in the electrode, a battery has large-area electrodes that are separated by a thin electrolyte. Therefore, the electrodes do not need to be thick, and, their electronic conductivity does not need to be high so long as they make contact with a metallic current collector. Consequently, in addition to containing an active material that exchanges electrons and ions, anodes and cathodes may contain other materials in addition to a metal backing to which a slurry of the active material is applied and dried. The slurry often contains, in addition to the active material, a binder to help it adhere to the backing and conductive materials, such as carbon particles. Once the slurry dries, it forms a coating on the metal backing.

Several important properties of rechargeable batteries include energy density, power density, capacity, particularly reversible capacity, rate capability, cycle life, thermal stability, cost, and safety. All of these properties are influenced by the choice of materials used to form the battery. The capacity of a battery is the amount of electronic charge that is transported at a constant current between the electrodes per unit weigh in the time $\Delta t$ for a complete discharge, and the energy density is the product of the average voltage during discharge and the capacity. Both decrease with increasing current and, therefore, power delivered. Moreover, the cycle life of a rechargeable battery is defined as the number of charge/discharge cycles before the capacity fades to 80% of its original capacity. Capacity fade is caused by a loss of the reversibility of the chemical reaction between the electrodes. For instance, many rechargeable sodium batteries experience a loss in reversible capacity as they are cycled because sodium ions ($Na^+$) tend to be trapped at the surface of a strongly reducing anode and then to remain there as a passivating solid electrolyte interface (SEI) layer, making them unavailable to enter and exit the cathode and anode. Since energy density is proportional to the capacity of a battery, this loss in reversible capacity also decreases the rechargeable battery's energy density with an increasing number of cycles.

Lithium batteries also experience decreases in important parameters due to lithium ion ($Li^+$). Extra lithium has previously been introduced into rechargeable lithium batteries to attempt to reduce reversible capacity and energy density loss. In one such battery, lithium metal was deposited directly onto the anode, but this increased manufacturing costs and deteriorated the uniformity and mechanical stability of the anode, causing other problems. In another battery, $Li_2MoO_3$ was added to the cathode, but this material has a practical capacity of only 250 mAh/g and thus was even worse at contributing charging capacity than $Li_2NiO_2$. In addition, the molybdenum (Mo) in $Li_2MoO_3$ dissolved in the electrolyte during battery use, also causing other problems.

In still another battery, $Li_2NiO_2$ was added to the cathode, but this material has a practical capacity of only 400 mAh/g, and this did not contribute sufficient capacity to be useful.

None of these materials work particularly well even in the context of lithium batteries. In addition, there is typically no reason to attempt to use counterpart materials in sodium batteries due to differences in the chemistry, crystal structure, or electrochemical properties. For instance, $Li_2NiO_2$ has a crystal structure in the space group Immm (FIG. 1A). In this crystal, $NiO_{4/2}$ units share edges along the a-axis, and lithium ion ($Li^+$) tetrahedral sites share edges in the ab plane. Li extraction causes the structure to collapse into an amorphous form. In contrast, $Na_2NiO_2$, despite the deceptively small change in the chemical formula, has a crystal structure in a different space group, $Cmc2_1$ (FIG. 1B). In this crystal, $NiO_{4/2}$ units also share edges along the a-axis, but they have a different orientation as compared to those in $Li_2NiO_2$. Furthermore, the sodium ions ($Na^+$) do not all occupy the same site in the crystal. Instead, there are two sodium ions ($Na^+$) sites. The Na1 site is a square pyramid site, while the Na2 site is a tetrahedral site. The Na1 sites share edges with one another and also share two edges with $2[NiO_{4/2}]$ units. Na2 sites share corners with one another and share one edge with a $NiO_{4/2}$ unit. Crystal structure is frequently important to the electrochemical activity of a material and thus one would not expect $Na_2NiO_2$ to be usable in a sodium battery based upon the limited usability of $La_2NiO_2$ in a lithium battery.

Furthermore, $Li_2NiO_2$ collapses when first delithiated to an amorphous material that cannot reintercalate lithium, making it a one-time-only cation donor. Although $Na_2NiO_2$ has also been used in lithium batteries, it was also used as a one-time-only cation donor ($Na^+$ cations can substitute for $Li^+$ cations in the electrolyte) likely based on the assumption that it also collapses into an amorphous material after desodiation.

In addition, even if one considered $Na_2NiO_2$ as a potential additive to sodium batteries, it is known that delitiation of $Li_2NiO_2$ produces oxygen gas ($O_2$) as a by-product. Sodium metal (Na) is highly reactive with oxygen gas ($O_2$). As a result, one would have expected desodiated $Na_2NiO_2$ to produce oxygen gas ($O_2$), which would poison the anode by reaction with sodium metal (Na) at the anode.

SUMMARY

Thus, it is very surprising in present disclosure that $Na_2NiO_2$ and its derivatives are very useful in a sodium battery because its crystal structure allows it to be electrochemically active, because it does not produce oxygen gas ($O_2$), and because, although loss of one sodium ion ($Na^+$) is irreversible, the resulting material, $NaNiO_2$ or a counterpart derivative, is stable and able to reversibly allow the removal and reinsertion of sodium into its crystal structure.

The present disclosure relates to a cathode additive for a rechargeable sodium battery, to mixtures of the additive and a cathode active material, to cathodes containing the additive, to electrochemical cells with cathodes containing the additive, and to rechargeable sodium batteries with cathodes containing the additive.

The cathode additive is $Na_2NiO_2$ or a derivative thereof. A secondary cathode additive formed from $Na_2NiO_2$ or a derivative thereof may also be present or added. Additional cathode additives, or a secondary cathode additive, such as $NaNiO_2$ or a counterpart derivative, not originally formed from $Na_2NiO_2$ or a derivative, may also be added.

In particular, the present disclosure relates to a cathode including a cathode active material containing sodium (Na) and a cathode additive including a compound having the general formula $Na_2Ni_{1-x}M_xO_2$, where $0 \leq x < 0.33$, and where M a transition metal, a metalloid, or any combinations thereof and/or a secondary cathode additive.

In some more detailed aspects, i) M is titanium (Ti), vanadium (V), chromium (Cr), manganese (Mn), iron (Fe), cobalt (Co), nickel (Ni), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof; ii-a) the secondary cathode additive includes a compound having the general formula $NaNi_{1-x}M_xO_2$, where $0 \leq x < 0.33$, and where M a transition metal, a metalloid, or any combinations thereof; ii-b) M is titanium (Ti), vanadium (V), chromium (Cr), manganese (Mn), iron (Fe), cobalt (Co), nickel (Ni), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof; iii-a) the secondary cathode additive is formed by loss of a sodium ion ($Na^+$) from the cathode additive after a first charge or discharge of the cathode; iii-b) the secondary cathode additive is further formed by a change in the crystal structure of the cathode additive after a first charge or discharge of the cathode; iv) the cathode additive and/or secondary cathode additive include particles and a coating on the particles to exclude water from the particles; v) the cathode includes 20 wt % or less cathode additive and/or secondary cathode additive, wherein wt % is measured by comparison to the total weight of cathode active material and cathode additive and/or secondary cathode additive; vi) the cathode includes at least 0.1 wt % cathode additive and/or secondary cathode additive, wherein wt % is measured by comparison to the total weight of cathode active material and cathode additive and/or secondary cathode additive; vii) the cathode active material includes a transition metal sulfide, a transition metal fluoride, a transition metal phosphate, a transition metal sulfates, a fluoridated transition metal phosphate, a fluoridated transition metal sulfate, a fluoridated transition metal vanadate, a fluoridated transition metal arsenate, a NASICON material having the general formula $NaM_2(XO_4)_3$, where M is a transition metal and X is Si, P, S, Mo, or As, a spinel $\lambda$-$MnO_2$ compound, or a layered or tunneled oxide with the general formula $NaMO_2$, where M is a transition metal. Any combinations of elements i-vii, including letter subparts thereof, is also possible.

The present disclosure further provides as a rechargeable battery including an anode, an electrolyte, and any cathode as described above. In more detailed aspects of the rechargeable battery, a) the anode includes an anode active material including sodium metal, a non-graphitic carbon, a metal oxide, or an intermetallic material; b) the electrolyte includes $NaPF_6$ and/or $NaClO_4$ or a salt thereof in a carbonate ester solvent; c) the battery is sealed to prevent water from entering the cathode; d) the cathode additive increases the reversible capacity of the cell by at least 50% of the theoretical capacity of the cathode additive. Any combinations of elements a-d is also possible.

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure.

DETAILED DESCRIPTION

The present disclosure relates to a cathode additive for a rechargeable sodium battery. It also includes a cathode containing this additive, an electrochemical cell containing this additive in the cathode, and a rechargeable battery containing this additive in at least one cathode.

Figure 1A:
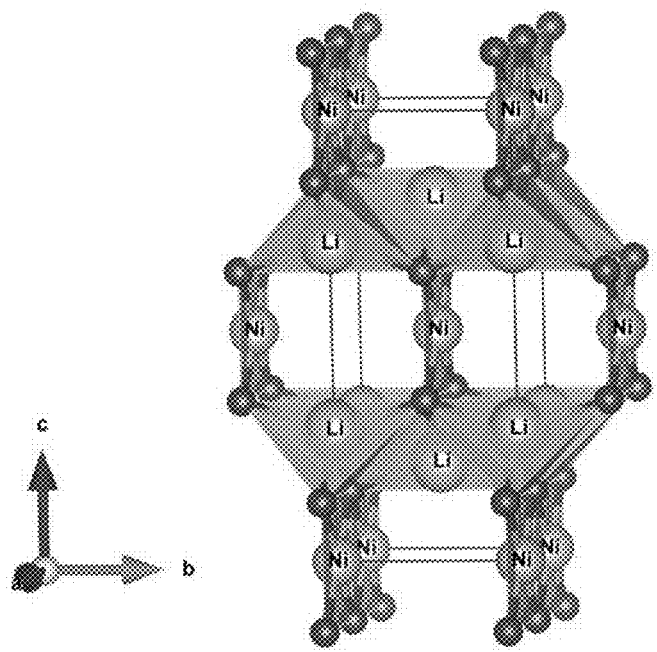
FIG. 1A is the crystal structure of $Li_2NiO_2$, as known in the prior art.
Figure 1B:
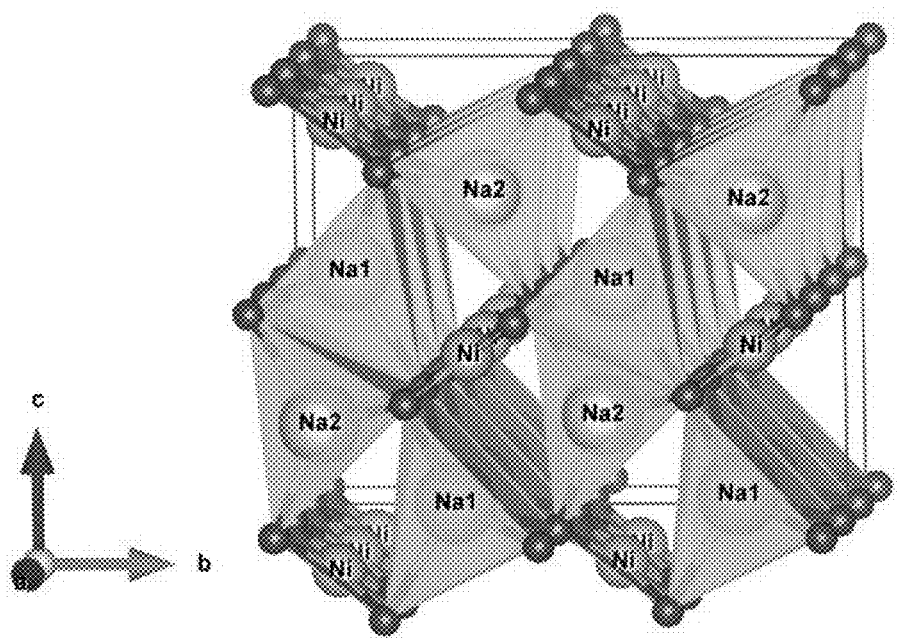
FIG. 1B is the crystal structure of $Na_2NiO_2$, as known in the prior art.

The cathode additive may have the general formula $Na_2NiO_2$ and be present in a crystal structure in the $Cmc2_1$ space group as shown in FIG. 1B prior to cycling of the sodium ion battery.

During first charge, the $Na_2NiO_2$ cathode additive decomposes wholly or partially to release sodium ions ($Na^+$) and to form secondary cathode additives. These secondary cathode additives may include a compound with the general formula $NaNiO_2$ and having a crystal structure in the C2/m space group. During subsequent charges, $NaNiO_2$ may release x sodium ions ($Na^+$) to form $Na_{1-x}NiO_2$, which is, thus, also a secondary cathode additive. During subsequent discharges, sodium ions ($Na^+$) may return to $Na_{1-x}NiO_2$ to reform $NaNiO_2$. $Na_2NiO_2$, however, does not substantially reform during any subsequent discharges.

The transition of $Na_2NiO_2$ to $NaNiO_2$ involves the transition for Ni from the Ni(II) valence state to the Ni(III) valence state. In addition the planar $NiO_{4/2}$ units transition to octahedral $NiO_{6/3}$ units.

The $Na_2NiO_2$ cathode additive and, to a lesser extent, the $NaNiO_2$ cathode additive provide additional sodium ions ($Na^+$) by electrochemical oxidation. These additional sodium ions ($Na^+$) may replace sodium ions ($Na^+$) originally present in the cathode active material or anode active material that are lost to SEI formation or other side reactions during cycling. This may enhance cathode utilization and delay the onset of or reduce the decrease in any one or combination of i) reversible capacity loss, ii) energy density loss, or ii) decrease in any other beneficial property due to a decrease in cyclable sodium ions ($Na^+$) availability as compared to an otherwise identical electrochemical cell or rechargeable lithium-ion battery lacking $Na_2NiO_2$ or $NaNiO_2$.

The cathode additive may alternatively or in addition have a $Na_2NiO_2$ derivative having the general formula $Na_2Ni_{1-x}M_xO_2$, where $0 \leq x < 0.33$, and where M is another element able to change at least one electrochemical property of $Na_2NiO_2$, such as its capacity or sodiation or desodiation voltage, without causing the material to collapse into an amorphous state after desodiation or to produce oxygen gas ($O_2$) after desodiation. For instance M may be a transition metal, a metalloid, or any combinations thereof. M may also be titanium (Ti), vanadium (V), chromium (Cr), manganese (Mn), iron (Fe), cobalt (Co), nickel (Ni), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof.

When the cathode additive is a $Na_2NiO_2$ derivative, some different secondary cathode additives may be formed. For instance, one secondary cathode additive may be a counterpart derivative of a $NaNiO_2$ having the general formula $NaNi_{1-x}M_xO_2$, where $0 \leq x < 0.33$, and where M is another element able to change at least one electrochemical property of $NaNiO_2$, such as its capacity or sodiation or desodiation voltage, without causing the material to collapse into an amorphous state after desodiation or to produce oxygen gas ($O_2$) after desodiation. For instance M may be a transition metal, a metalloid, or any combinations thereof. M may also be titanium (Ti), vanadium (V), chromium (Cr), manganese (Mn), iron (Fe), cobalt (Co), nickel (Ni), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof.

The cathode additive may include combinations of $Na_2NiO_2$ and its derivates, or combinations of derivatives. In addition secondary cathode additives may include combinations of $NaNiO_2$ and its counterpart derivatives, or combinations of its counterpart derivatives.

A cathode additive as described above may be added to any cathode or cathode active material and may form any secondary cathode additive after one or more charges or discharges. A secondary cathode additive, such as $Na_{1-x}NiO_2$ and/or $NaNiO_2$ and other counterpart derivatives may also be independently added to a cathode or cathode active material or added in addition to $Na_2NiO_2$ or a derivative. A cathode additive and/or any secondary cathode additive may be added in any amount sufficient to obtain a certain amount of delay in the onset of or decrease of any desirable beneficial property. The amount of cathode additive and/or any secondary cathode additive may be limited to avoid or decrease any drawbacks, such as might occur if the cathode active material is too diluted. In some instances, the total amount of cathode additive and/or any secondary cathode additive in the cathode active material (excluding any current collector) based on total weight of the additive and cathode active material may be 20 wt % or less, 10 wt % or less 5 wt % or less, 2 wt % or less, 1 wt % or less, or 0.5 wt % or less. It may also be at least 0.01 wt %, at least 0.1 wt %, at least 0.5 wt %, or at least 1 wt %. It may also vary between combinations of these end points (where the amount or less is more than the at least amount).

Any cathode active material usable in a rechargeable sodium battery may benefit from the addition of a cathode additive and/or any secondary cathode additive. Most cathode active materials for rechargeable sodium batteries can intercalate and release sodium ions ($Na^+$) during charge/discharge cycles. Suitable cathode active materials include transition metal sulfides, such as $NaTiS_2$; transition metal fluorides, particularly perovskite fluorides, such as $NaFeF_3$; transition metal phosphates, such as $NaFePO_4$ and $NaMn_{0.5}Fe_{0.5}PO_4$, as well as transition metal sulfates, vanadates, and arsenates; fluoridated transition metal phosphates, sulfates, vanadates, and arsenates, such as $NaVPO_4F$, $Na_2FePO_4F$, and $NaMSO_4F$, where M is a transition metal, such as Fe; NASICON materials having the general formula $NaM_2(XO_4)_3$, where M is a transition metal and X is Si, P, S, Mo, or As, such as $Na_3V_2(PO_4)_3$; spinel $\lambda$-$MnO_2$ compounds, such as $Na_{0.44}MnO_2$ and $Na_4Mn_9O_{18}$; layered and tunneled oxides with the general formula $NaMO_2$, where M is a transition metal, such as $NaCoO_2$, $NaFeO_2$, $NaMnO_2$, $NaCrO_2$, $NaMo_2O_4$, $\alpha$-$V_2O_5$ combined with $NaV_3O_8$, $\beta$-$NaV_2O_5$, and $NaFe_3O_4$. These cathode active materials may contain more than one transition metal, such as a combination of Fe and Mn. These cathode active materials may also contain non-transition metals, such as Mg and Al. The cathode may contain more than one cathode active material.

$Na_2NiO_2$ has a theoretical capacity of 392.2 mAh/g. When added to a cathode active material, $Na_2NiO_2$ or another cathode additive may provide a reversible capacity increase corresponding to at least 20% of the $Na_2NiO_2$ or other cathode additive theoretical capacity, at least 30% of the $Na_2NiO_2$ or other cathode additive theoretical capacity, at least 40% of the $Na_2NiO_2$ or other cathode additive theoretical capacity, at least 50% of the $Na_2NiO_2$ or other cathode additive theoretical capacity, at least 80% of the $Na_2NiO_2$ or other cathode additive theoretical capacity, or at least 90% of the $Na_2NiO_2$ or other cathode additive theoretical capacity.

Cathode additives and/or secondary cathode additives may be present in the form of small particles, such as particles with a largest dimension on average of 50 µm or less, 10 µm or less, 5 µm or less, 1 µm or less, 500 nm or less, or 100 nm or less. Particle size may be limited such that material in the particle core may participate in the electrochemical processes. Cathode additive and/or secondary cathode additives particles may be aggregated with cathode material particles or with another material in the cathode. They may also be separate, but otherwise mixed with the cathode. They may also be placed on the cathode as a separate layer.

Cathode additives and/or secondary cathode additives such as $Na_2NiO_2$ and $NaNiO_2$, which are unstable in water, may be coated to minimize exposure to oxygen, water, or both, prior to release of sodium ions ($Na^+$), prior to its addition to a cathode active material, or prior to its addition to a cathode. This coating may be a coating formed with the cathode additive and/or secondary cathode additives. Many cathode additives and/or secondary cathode additives react with water in a manner that harms their ability to contribute sodium ions ($Na^+$) to a rechargeable battery. In addition to or as an alternative to coatings, the cathode additive and/or secondary cathode additives may be formed, added to cathode active material, or formed into a cathode, or formed into an electrochemical cell or battery in a dry room to avoid exposure to air. Many cathode active materials are also unstable in the presence of water, allowing cathode additive and/or secondary cathode additive processing to be incorporated into existing cathode-related dry room procedures.

Cathodes containing a cathode additive and/or secondary cathode additives may contain other materials in addition to the cathode additive and/or secondary cathode additive and the cathode active material. For instance they may include a metal sheet or other current collector, a binder, a conductivity enhancer, such as carbon, and any combinations thereof.

Figure 2:
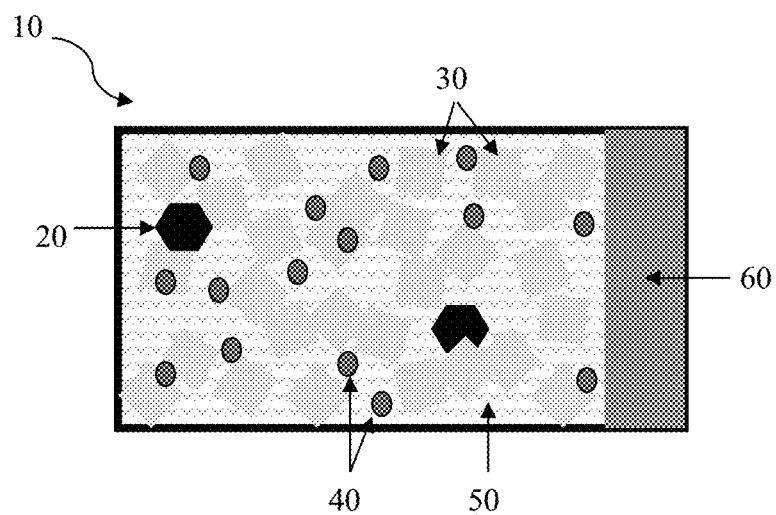
FIG. 2 is a cross-sectional, schematic diagram (not to scale) of a cathode containing a cathode additive.

FIG. 2 is a cross-sectional, schematic diagram of a cathode 10 containing cathode additive and/or secondary cathode additive particles 20 as well as cathode active material particles 30. In this example, conductivity enhancer particles 40 are also present, along with binder 50, and the entire mixture is on a metal sheet 60.

Rechargeable sodium ion batteries may include sodium ion, sodium metal, sodium polymer, sodium air, and sodium sulfur rechargeable batteries.

A rechargeable battery with a cathode additive and/or secondary cathode additive in its cathode may have any suitable anode. For instance, the anode may include an anode active material such as sodium metal (Na); non-graphitic carbon (C), such as petroleum cokes, hard carbon, carbon black, pitch-based carbon-fibers, and polymers, such as poly(para-phenylene); metal oxides, such as $Na_2Ti3O_7$; and intermetallic anodes, such as Sb/C, Sn/C, and SnSb/C. The anode may contain more than one anode active material. The anode may also contain other materials in addition to the any active material, such as a metal sheet, a binder, a conductivity enhancer, and any combinations thereof.

In some instances, an anode material may be used as a cathode and a cathode material may be used as an anode, depending on the acceptable voltage or other operations parameters of the battery.

The electrolyte may be any electrolyte suitable for use at the voltage dictated by the cathode an anode. In order to avoid reaction of the cathode additive and/or secondary cathode additive, such as $Na_2NiO_2$ and/or $NaNiO_2$, with water, the electrolyte may be non-aqueous. Suitable electrolytes include $NaPF_6$ and/or $NaClO_4$ as salts in carbonate ester solvents, such as propylene carbonate (PC), fluoroethylene carbonate (FEC), ethylene carbonate (EC), and/or diethyl carbonate (DEC).

Although the above electrolytes are primarily liquids, gel or solid electrolytes may also be used. Such electrolytes may be particularly useful in avoiding the presence of water in the rechargeable battery A rechargeable battery may also contain a separator to electrically insulate the cathode and anode with the battery. The battery may further contain contacts, a casing, or wiring. The battery may be sealed to prevent water from entering the cathode. The battery may be in traditional form, such as a coin cell or jelly roll, or a more complex battery such as a prismatic cell.

A rechargeable battery of the present disclosure may include a single electrochemical cell or multiple cells. Batteries with more than one cell may contain components to connect or regulate these multiple electrochemical cells.

In the case of more sophisticated batteries, they may contain more complex components, such as safety devices to prevent hazards if the battery overheats, ruptures, or short circuits. Particularly complex batteries may also contain electronics, storage media, processors, software encoded on computer readable media, and other complex regulatory components.

Rechargeable batteries of the present disclosure may be used in a variety of applications. They may be in the form of standard battery size formats usable by a consumer interchangeably in a variety of devices. They may be in power packs, for instance for tools and appliances. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present disclosure may have industrial uses, such as energy storage in connection with energy production, for instance in a smart grid, or in energy storage for factories or health care facilities, for example in the place of generators.

EXAMPLES

The following examples illustrate certain aspects of the invention.

Example 1

Figure 3:
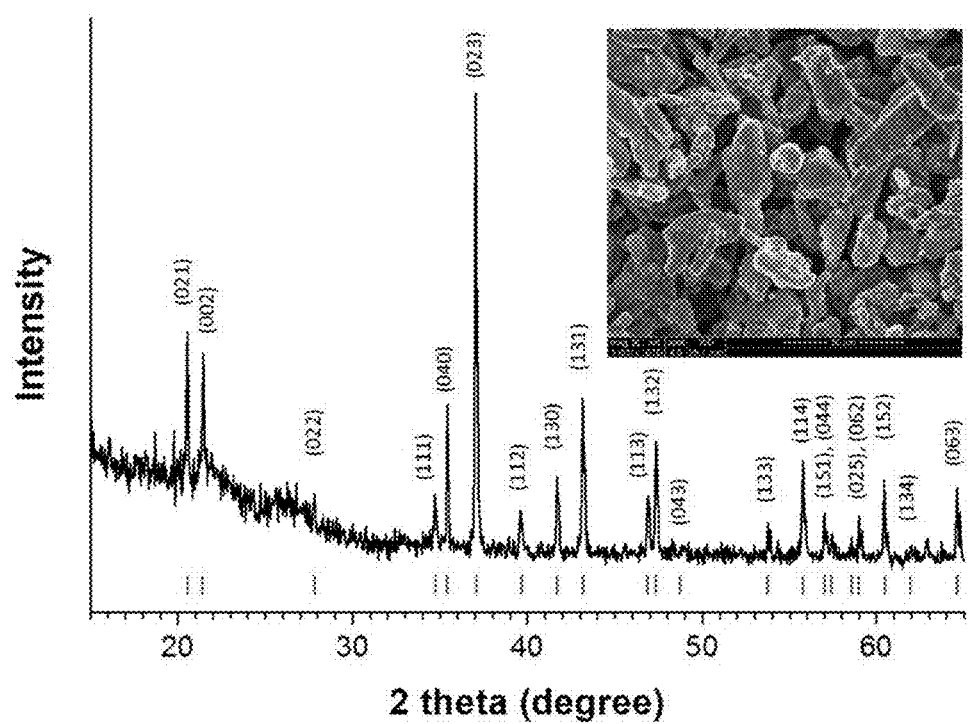
FIG. 3 is an X-ray diffraction (XRD) pattern of $Na_2NiO_2$ powder; the inset image is a scanning electron microscope (SEM) image of the $Na_2NiO_2$ powder.

Electrochemical Characterization of $Na_2NiO_2$ $Na_2NiO_2$ was prepared via a solid state reaction method. Stoichiometric amounts (Na:Ni=2:1) of $Na_2O$ and NiO were mixed in a glove box and fired at 600° C. under an argon atmosphere for 20 hours. The synthesized $Na_2NiO_2$ formed large particle ranging between 10 μm and 50 μm in average diameter, as shown in the inset image of FIG. 3.

The particles were ground into a fine powder, which was covered with polyimide film to protect it the from atmospheric moisture, then characterized using X-ray diffraction (XRD) (Philips X'Pert Pro MPD diffractometer; 38 kV, 30 mA; Cu Kα radiation) to confirm phase formation. The powder XRD pattern, shown in FIG. 3, was indexed as a single-phased $Na_2NiO_2$ (PDF no. 1712366; a=2.820, b=10.141, c=8.283 Å) without any impurity. The broad background signal at lower angles in the XRD pattern originated from the polyimide film for protecting the powder from air and moisture.

2032-type coin cells employing a Na-metal counter electrode and 1 M $NaClO_4$ in ethylene carbonate/diethyl carbonate/fluoroethylene carbonate (EC/DEC/FEC 4.5/4.5/1 in volume) liquid electrolyte were prepared. A glass fiber membrane was used as the separator.

Figure 4:
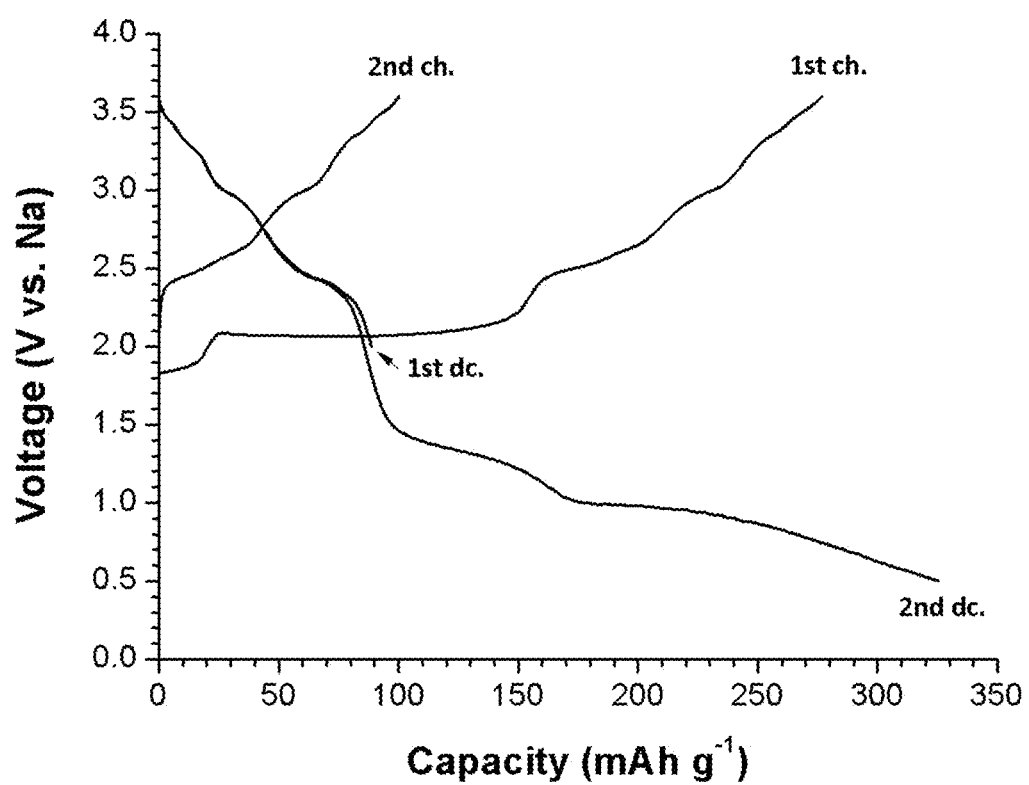
FIG. 4 is a charge/discharge curve for a half cell containing $Na_2NiO_2$.

Electrochemical charge/discharge properties of $Na_2NiO_2$ alone were characterized as shown in FIG. 4. $Na_2NiO_2$ was charged and discharged at different voltage ranges and a low current density of C/50 to check its Na insertion/extraction properties. Desodation from $Na_2NiO_2$ began at around 1.8 V vs. Na. After charging at approximately 25 mAh/g, a long voltage plateau was observed at around 2.1 V vs. Na up to around 150 mAh/g. Further desodiation showed several voltage steps that were reproduced during the sodiation reaction during the subsequent first discharge.

The voltage range of 2.0-3.6 V vs. Na was scanned again to confirm reversibility of the voltage steps during a second cycle. The voltage steps were reproducible and reversible. After reaching to 2.0 V vs. Na at the second discharge, the $Na_2NiO_2$ was further discharged to 0.5 V vs. Na. The 2.1 V vs. Na plateau did not reversibly present during the second discharge, suggesting that it arose from an irreversible phase transition via a two-phase equilibrium reaction. Instead of the 2.1 V vs. Na voltage plateau, a gradual voltage slope and another voltage plateau were observed at around 1.3 V vs. Na and around 1.0 V vs. Na, respectively. This data suggests that (i) the first charging capacity of $Na_2NiO_2$ is as high as 276.5 mAh g$^{-1}$, (ii) the following discharge exhibits 88.7 mAh g$^{-1}$ (coulombic efficiency=32%), and (iii) the material can be reversibly cycled in the voltage range of 2.0-3.6 V vs. Na after the first cycle.

Figure 5:
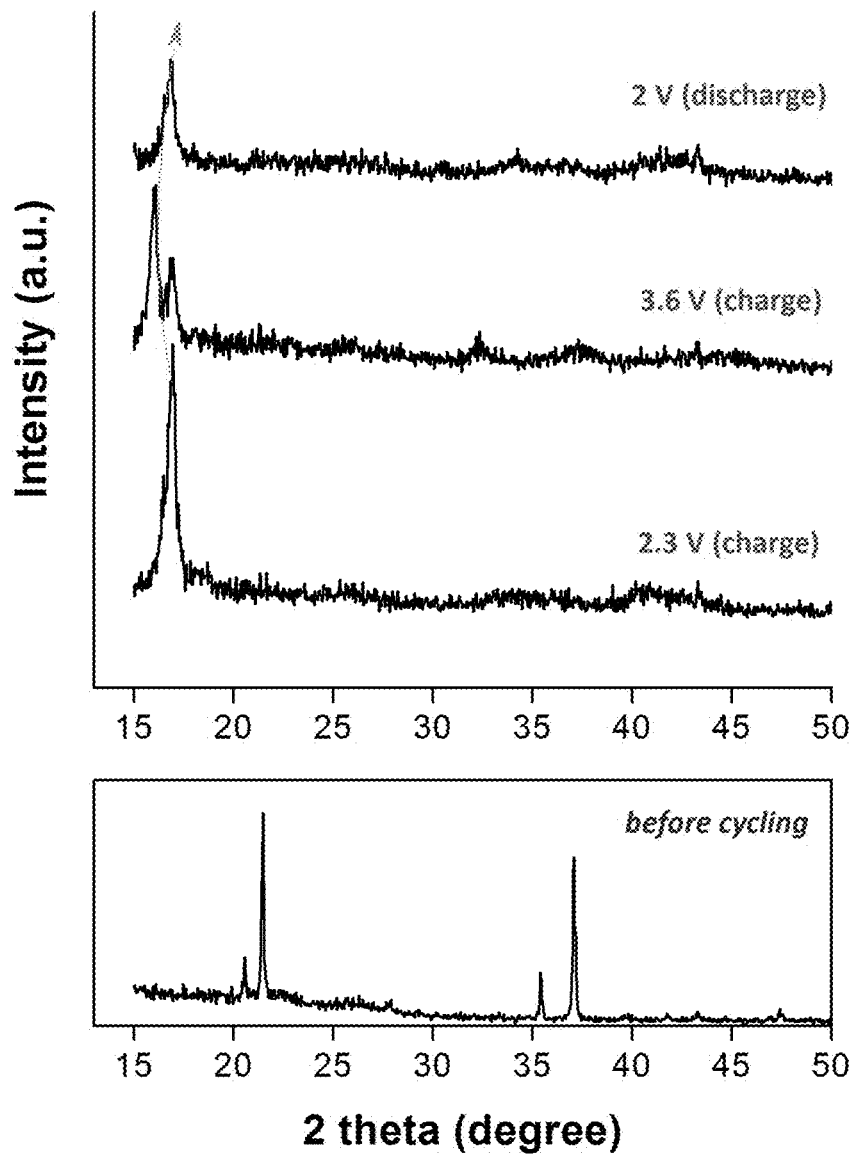
FIG. 5 is XRD patterns of $Na_2NiO_2$ and secondary materials after cycling.

XRD was conducted on the material at various stages of cycling, the results of which are presented in FIG. 5. The electrodes were collected by disassembling the cell in a glove box, then washing and rinsing each electrode twice with dimethyl carbonate (DMC), followed by drying in a vacuum.

$Na_2NiO_2$ was present prior to cycling, as shown by the XRD pattern. However, after cycling secondary materials were formed from $Na_2NiO_2$, as can be seen by their XRD patterns. After an initial charge at 2.3 V vs. Na, the material of the 2.1 V vs. Na plateau was examined. The XRD pattern was not conclusive, but the strong reflection at 16.9° could corresponds to the monoclinic $NaNiO_2$ (001) peak, indicating that $NaNiO_2$ was formed, but not ruling out the formation of other secondary materials.

The material was discharged then charged again at 3.6 V vs. Na. XRD analysis after this charge showed that the (001) peak had shifted to a lower angle owing to an interslab oxygen-oxygen repulsion after desodation. However, some portion of the peak still remained at the original position, which indicates that $NaNiO_2$ partially participated in the electrochemical oxidation. Participation was likely only partial due to the large size of the particles (10 μm to 50 μm, as noted above), which limited access to material in the particle cores.

The material was then discharged back to 2.0 V vs. Na and another sample indicating that desodiated $Na_{1-x}NiO_2$ reversibly regained sodium ions (Na$^+$) and reformed $NaNiO_2$.

Figure 6:
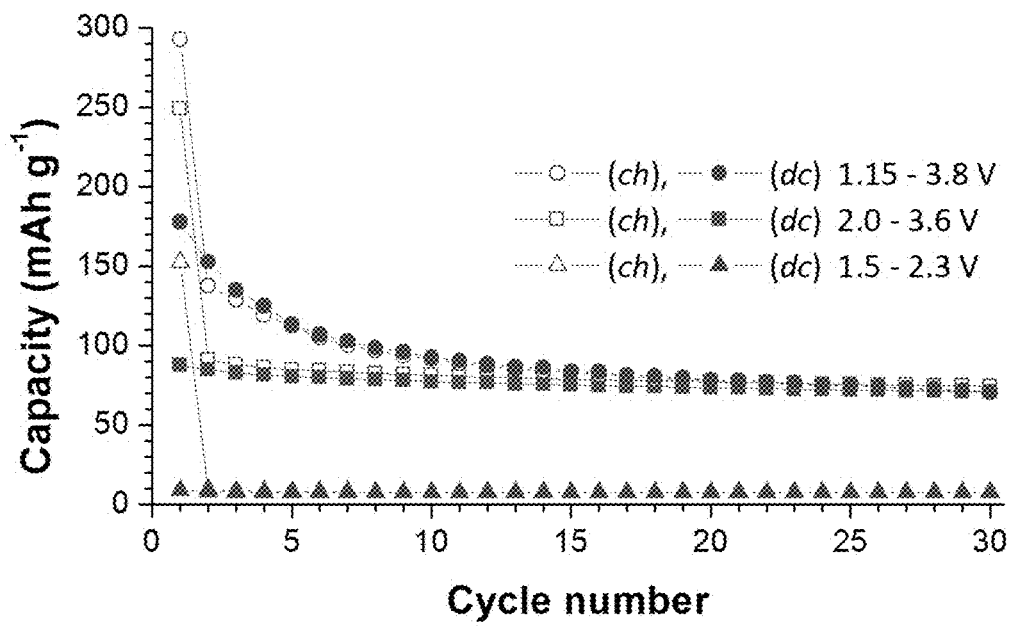
FIG. 6 is a charge/discharge curve for a half cell containing $Na_2NiO_2$ at a variety of voltages.
Figure 7A:
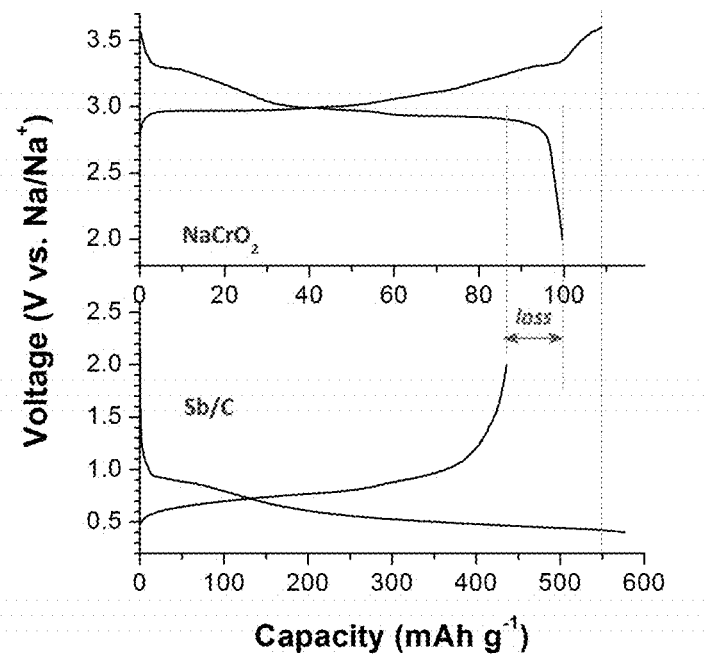
FIG. 7A is charge/discharge curves for half cells containing $NaCrO_2$ or Sb/C.
Figure 7B:
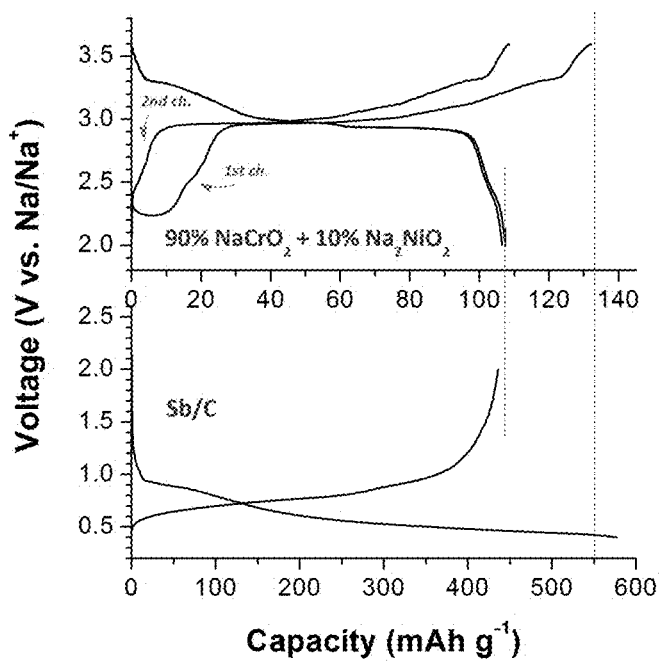
FIG. 7B is charge/discharge curves for half cells containing $NaCrO_2$ and $Na_2NiO_2$ or Sb/C.
Figure 7C:
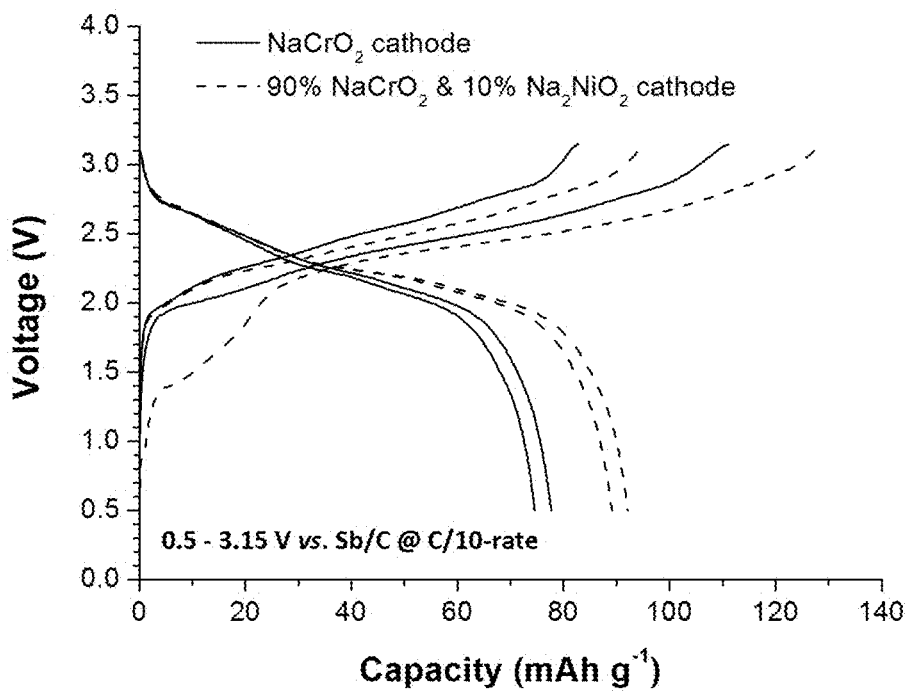
FIG. 7C is a charge/discharge curves for full cells containing $NaCrO_2$ as the sole active material in the cathode or a combination of $NaCrO_2$ and $Na_2NiO_2$ in the cathode. The anode contains Sb/C as the active material.

The irreversible transition of orthorhombic $Na_2NiO_2$ to layered $NaNiO_2$, followed by reversible sodium ion (Na$^+$) extraction/insertion of $NaNiO_2$ was further confirmed by charge/discharge tests at different voltage ranges as shown in FIG. 6. Three voltage ranges were tested: (i) 1.5-2.3 V vs. Na, (ii) 2.0-3.6 V vs. Na, and (iii) 1.15-3.8 V vs. Na at a current density of C/20.

Reversibility of the 2.1 V vs. Na plateau was examined to determine whether $NaNiO_2$ could be resodiated to reform $Na_2NiO_2$. Galvanostatic cycling between 1.5 V vs. Na and 2.3 V vs. Na clearly indicated that the phase transition process from orthorhombic $Na_2NiO_2$ to layered $NaNiO_2$ was irreversible.

In the voltage range between 2.0 V vs. Na and 3.6 V vs. Na, $NaNiO_2$ cycled reversibly between $NaNiO_2$ and $Na_{1-x}NiO_2$ with a slight capacity decay, but the voltage steps were reproducible throughout the test.

To characterize the gradual voltage slope at around 1.3 V vs. Na, the charging cut-off voltage was set to 3.8 V vs. Na, which increased the first charging capacity to 292.8 mAh/g. At around 1.3 V vs. Na, the material showed a fast decay in capacity, corresponding with the gradual slope.

Example 2

Batteries Containing $Na_2NiO_2$ Cathode Additive

A 2032-type coin cell was formed to evaluate the effects of $Na_2NiO_2$ and/or secondary cathode additives on a sodium battery.

$Na_2NiO_2$ was formed as described above and added to $NaCrO_2$ cathode active material to form a cathode. The $NaCrO_2$ with a cathode additive contained 10 wt % $Na_2NiO_2$ based on total weight of the additive and cathode active material. The cathode also contained carbon and polytetrafluoroethylene (PTFE). The ratio of $NaCrO_2$(plus cathode additive, if applicable):carbon:PTFE was 75:20:5 by weight. The coin cell also contained a stainless steel cathode current collector.

An anode was formed with Sb/C (7/3) composite active material:carbon:caroxymethyl cellulose (Na-CMC; dissolved in water) in a ratio of 80:10:10 by weight. The anode was coated onto a Cu current collector, then dried.

1 M $NaClO_4$ in ethylene carbonate/diethyl carbonate/fluoroethylene carbonate (EC/DEC/FEC 4.5/4.5/1 in volume) was used as a liquid electrolyte. The cell also contained a Celgard 2500 separator.

Sb/C exhibits a sluggish voltage slope down to 0.4 V vs. Na followed by a steep voltage decrease under 0.4 V during sodium ion (Na$^+$) insertion. During the first cycle, it has discharge (sodiation) and charge (desodiation) capacities of 772.8 and 616.1 mAh/g (coulombic efficiency=79.7%) in the 0.01-2.0 V vs. Na range and 576.7 and 435.7 mAh/g (coulombic efficiency=75.5%) in the 0.4-2.0 V vs. Na range.

FIG. 8A and FIG. 8B compare initial cathode/anode capacities in half cells with and without $Na_2NiO_2$ in the cathode. As shown in FIG. 8A, without $Na_2NiO_2$ in the cathode, $NaCrO_2$ lost around 13 mAh/g of capacity due to the poor initial coulombic efficiency of the Sb/C anode. Therefore, a reversible capacity of at most around 86 mAh/g was possible for later cycles.

As shown in FIG. 8B, blending 10 wt % (based on weight of cathode active material and cathode additive) of $Na_2NiO_2$ into the $NaCrO_2$ cathode active material increased the charge and discharge capacities to 132.1 mAh/g on charge and 107.5 mAh/g on discharge. The increased discharge capacity was attributed to the higher electrochemical activation of $Na_2NiO_2$ that is embedded in the $NaCrO_2$ electrode.

FIG. 8C shows the full cell capacity for a cell with the Sb/C anode and a $NaCrO_2$ with or without 10 wt % $Na_2NiO_2$. The initial coulombic efficiency of the cathode containing $NaCrO_2$ drops to 81.4%, which is well-matched to the capacity drop of the anode. Therefore, the cathode capacity is fully utilized with the Sb/C anode.

* * *

Although only exemplary embodiments of the disclosure are specifically described above, it will be appreciated that modifications and variations of these examples are possible without departing from the spirit and intended scope of the disclosure. For instance, numeric values expressed herein will be understood to include minor variations and thus embodiments "about" or "approximately" the expressed numeric value unless context, such as reporting as experimental data, makes clear that the number is intended to be a precise amount.

The invention claimed is:

1. A rechargeable battery comprising:
an anode;
an electrolyte;
a cathode comprising
a cathode active material comprising sodium (Na); and
a cathode additive comprising a compound having the general formula $Na_2Ni_{1-x}M_xO_2$, where $0 \leq x < 0.33$, and where M is a transition metal, a metalloid, or any combinations thereof,
wherein the rechargeable battery is a sodium ion battery.

2. The rechargeable battery of claim 1, wherein M is titanium (Ti), vanadium (V), chromium (Cr), manganese (Mn), iron (Fe), cobalt (Co), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof.

3. The rechargeable battery of claim 1, wherein the cathode active material comprises a transition metal sulfide, a transition metal fluoride, a transition metal phosphate, a transition metal sulfates, a fluoridated transition metal phosphate, a fluoridated transition metal sulfate, a fluoridated transition metal vanadate, a fluoridated transition metal arsenate, a NASICON material having the general formula $NaM_2(XO_4)_3$, where M is a transition metal and X is Si, P, S, Mo, or As, a spinel $\lambda$-$MnO_2$ compound, or a layered or tunneled oxide with the general formula $NaMO_2$, where M is a transition metal.

4. The rechargeable battery of claim 1, wherein the cathode additive increases the reversible capacity of the cell by at least 50% of the theoretical capacity of the cathode additive.

5. The rechargeable battery of claim 1, further comprising a secondary cathode additive.

6. The rechargeable battery of claim 5, wherein the secondary cathode additive comprises a compound having the general formula $NaNi_{1-x}M_xO_2$, where $0 \leq x < 0.33$, and where M a transition metal, a metalloid, or any combinations thereof.

7. The rechargeable battery of claim 6, wherein M is titanium (Ti), vanadium (V), chromium (Cr), manganese (Mn), iron (Fe), cobalt (Co), copper (Cu), molybdenum (Mo), tungsten (W), ruthenium (Ru), zirconium (Zr), niobium (Nb), aluminum (Al), magnesium (Mg), boron (B), gallium (Ga), germanium (Ge), silicon (Si), or any combinations thereof.

8. The rechargeable battery of claim 7, wherein the secondary cathode additive is further formed by a change in the crystal structure of the cathode additive after a first charge or discharge of the cathode.

9. The rechargeable battery of claim 5, wherein the secondary cathode additive is formed by loss of a sodium ion ($Na^+$) from the cathode additive after a first charge or discharge of the cathode.

10. The rechargeable battery of claim 5, comprising 20 wt % or less cathode additive and secondary cathode additive, wherein wt % is measured by comparison to the total weight of cathode active material and cathode additive and secondary cathode additive.

11. The rechargeable battery of claim 5, comprising at least 0.1 wt % cathode additive and secondary cathode additive, wherein wt % is measured by comparison to the total weight of cathode active material and cathode additive and secondary cathode additive.

* * * * *